March 26, 1946.  O. C. HEDIN  2,397,109
DEVICE FOR PRECISION DRAWING
Filed Oct. 5, 1943   6 Sheets-Sheet 4
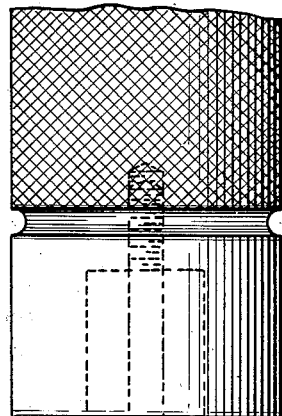
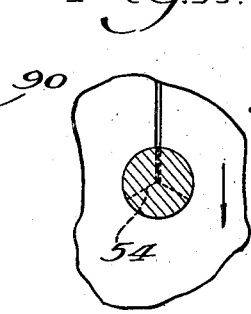
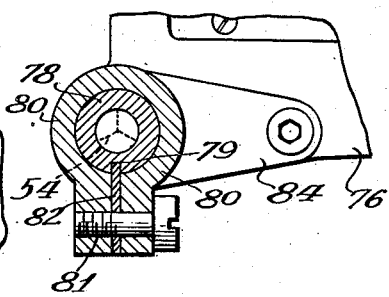
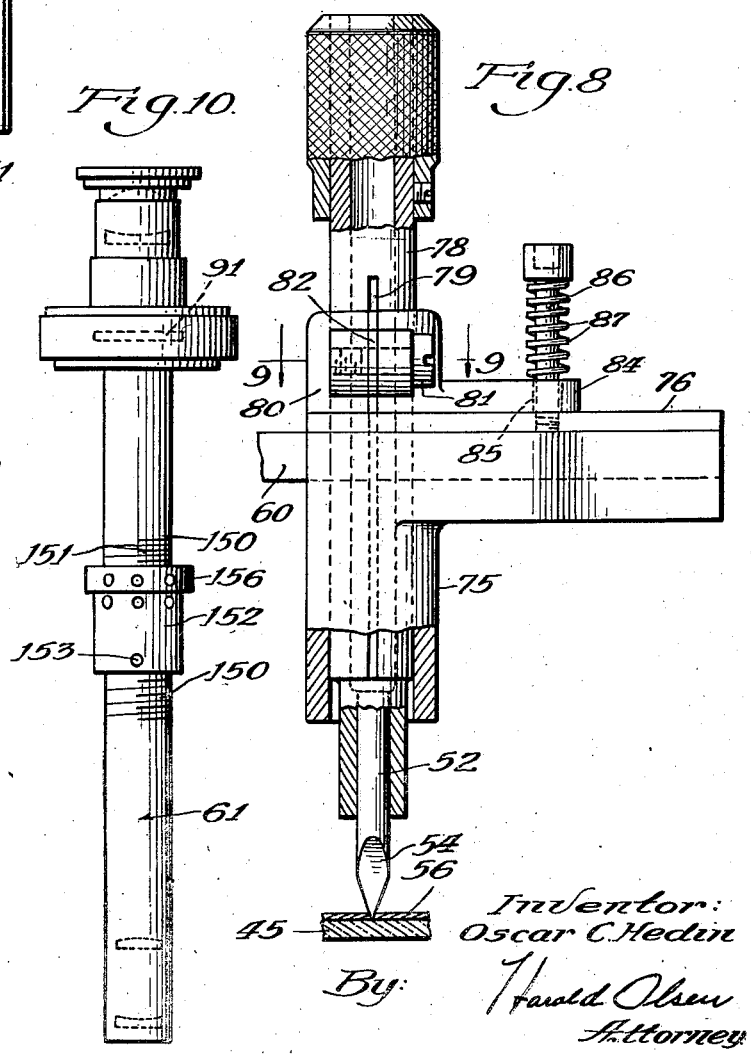

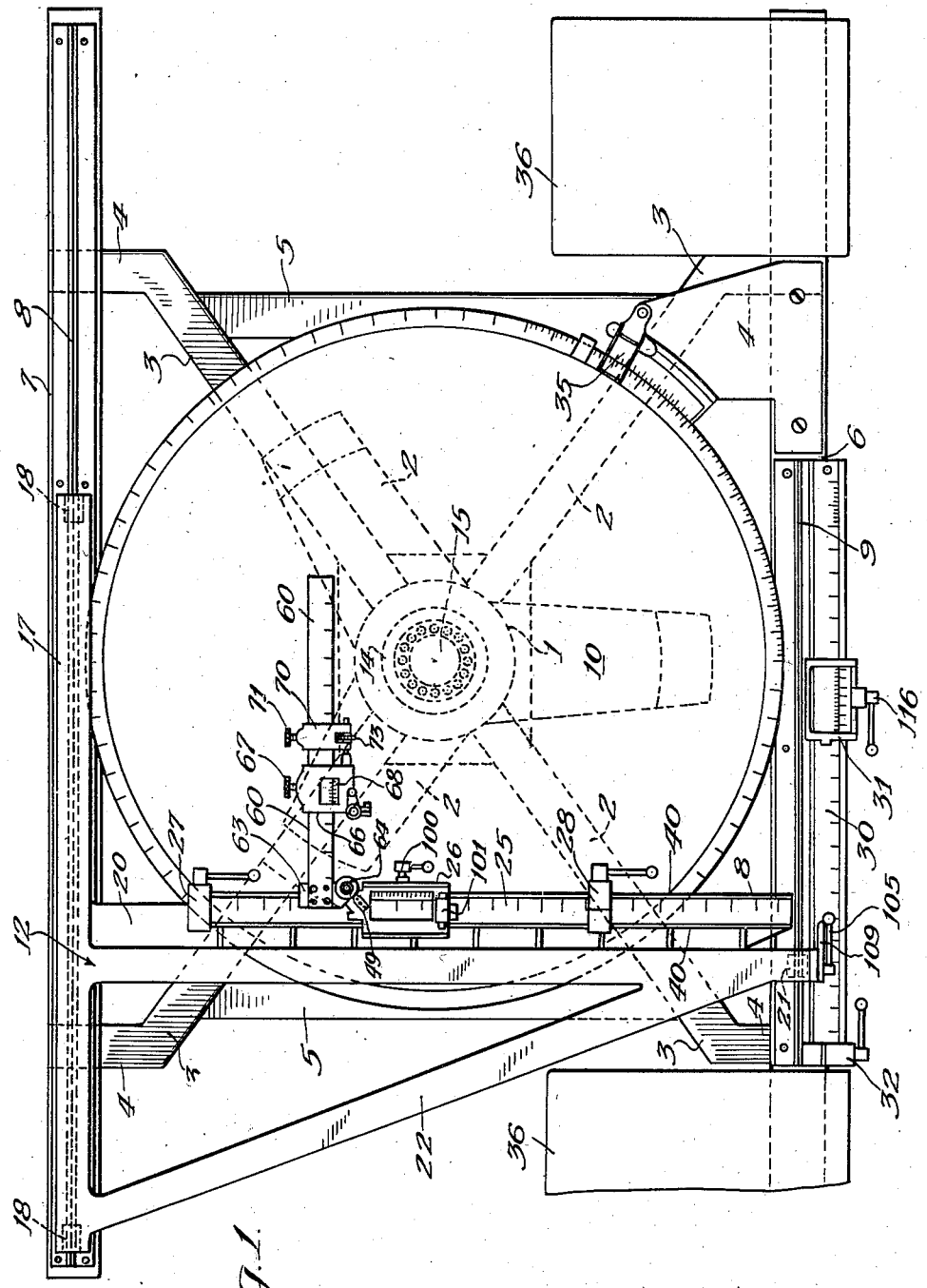

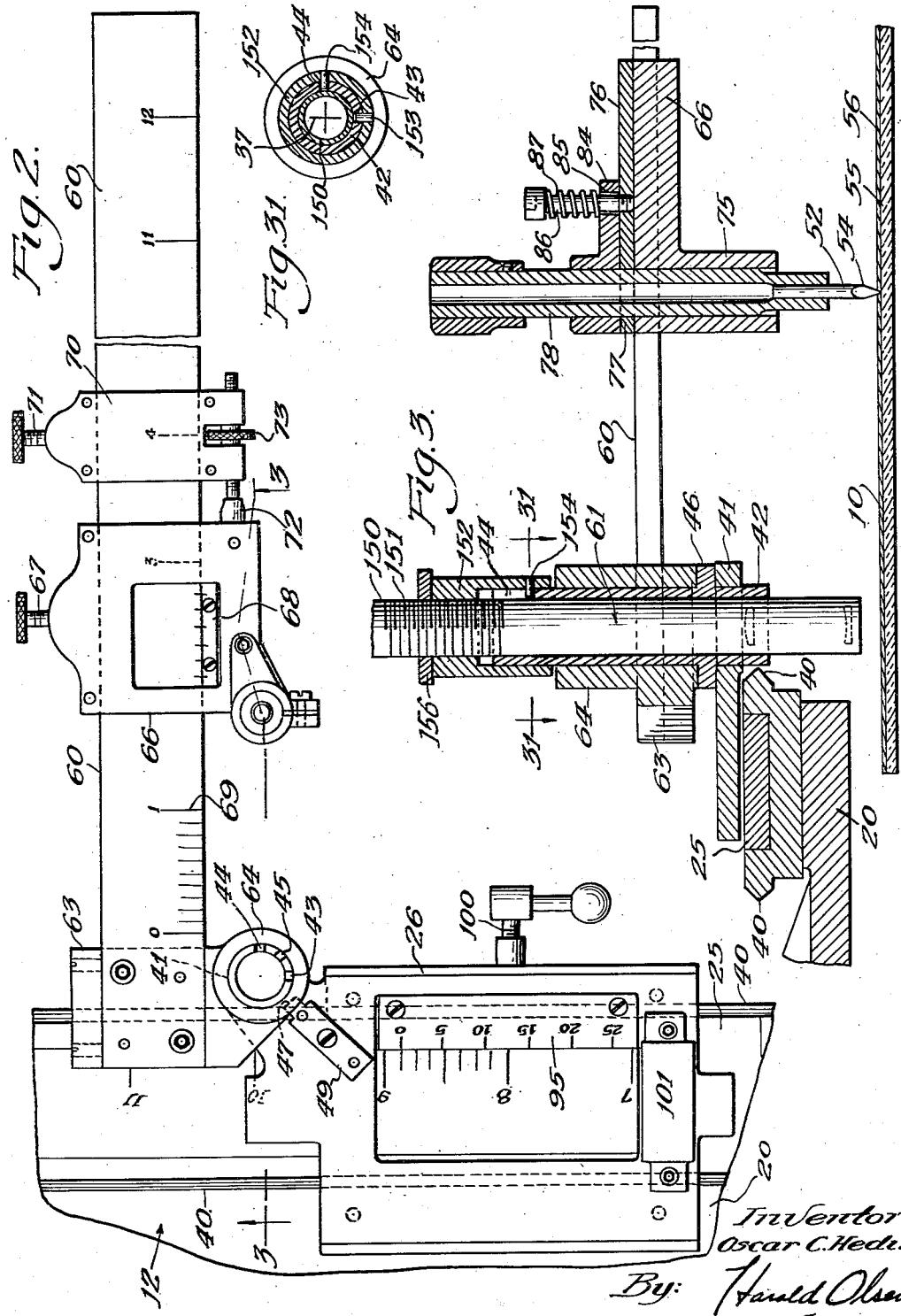

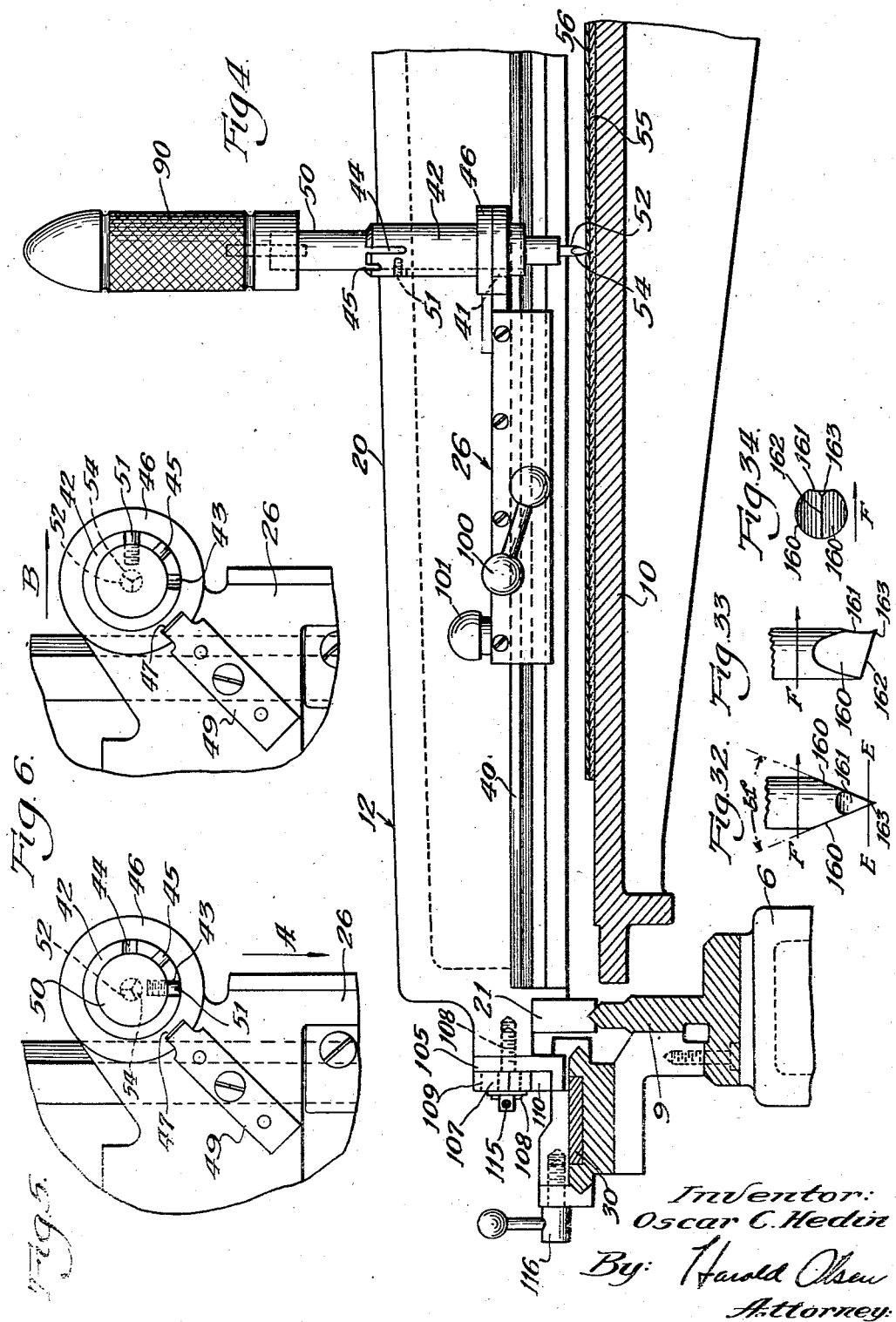

March 26, 1946.  O. C. HEDIN  2,397,109
DEVICE FOR PRECISION DRAWING
Filed Oct. 5, 1943  6 Sheets-Sheet 5
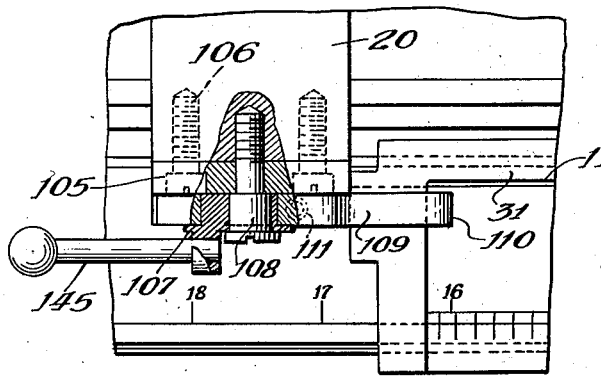
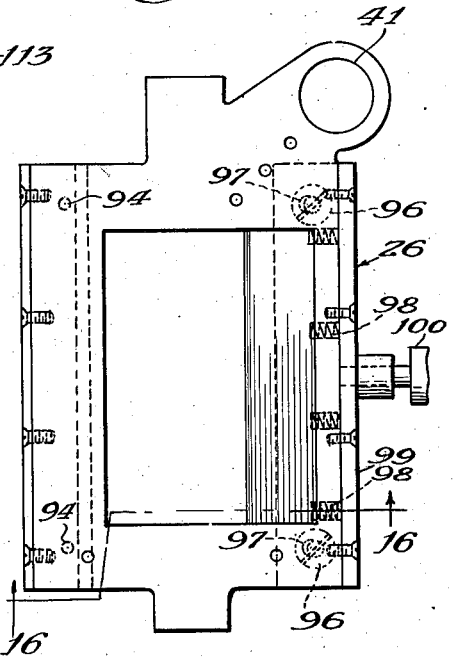
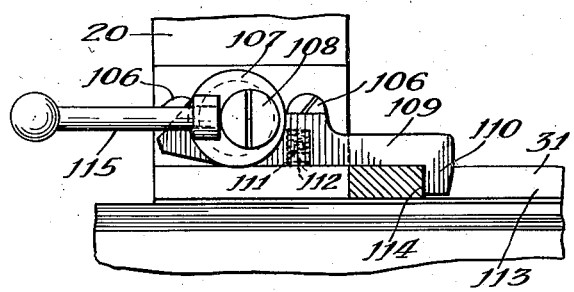
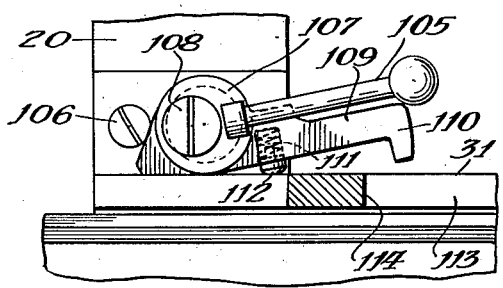
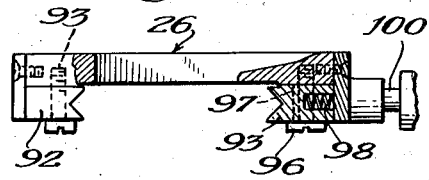
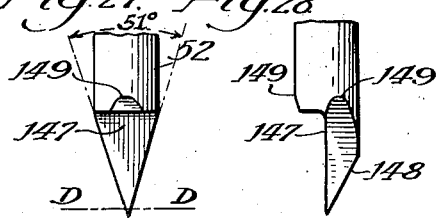
Inventor:
Oscar C. Hedin
By: Harold Olsen
Attorney

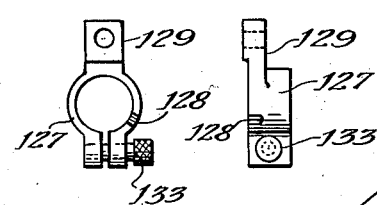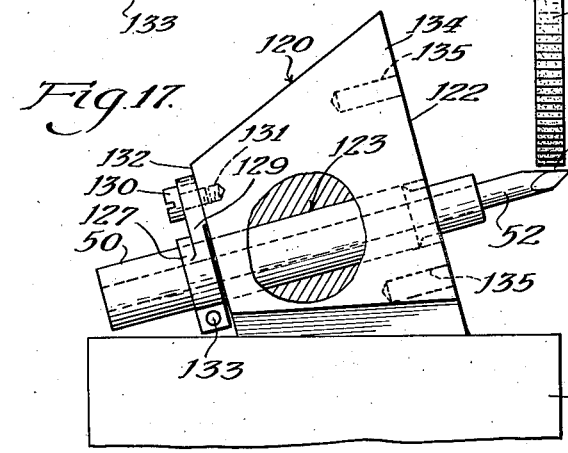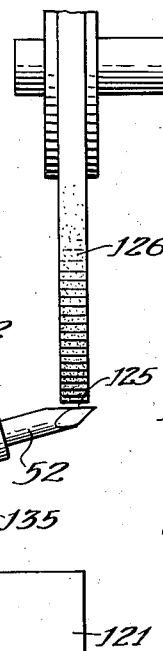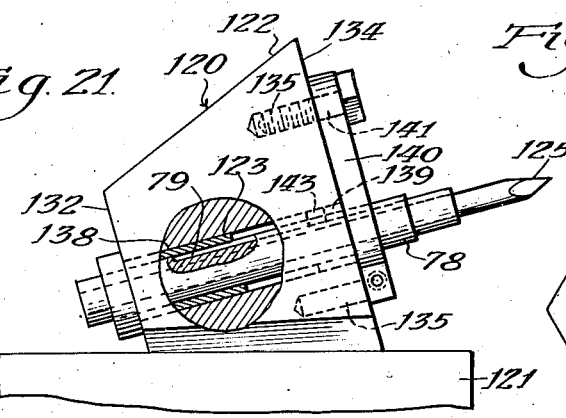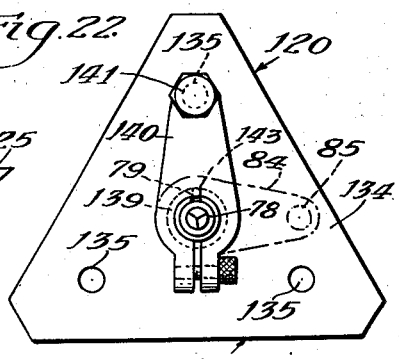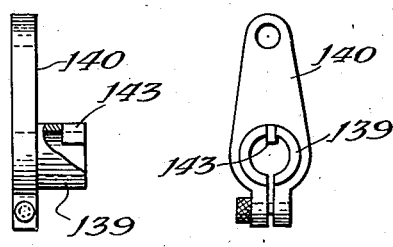

Patented Mar. 26, 1946

2,397,109

UNITED STATES PATENT OFFICE 2,397,109

DEVICE FOR PRECISION DRAWING

Oscar C. Hedin, Cleveland Heights, Ohio, assignor to The Weldon Tool Company, Cleveland, Ohio, a corporation of Ohio Application October 5, 1943, Serial No. 505,034

14 Claims. (Cl. 33—26)

This invention relates principally to devices and to tools for use by such devices, for cutting emulsion coatings of transparent plates, to produce articles known as "master drawings," for use in optical inspection. My new article of the above character is shown and described in my copending application Serial No. 468,557.

In optical inspection light is projected across the periphery of a piece, to be inspected or to be formed, in a manner to optically produce an enlarged shadow of that periphery on a shadow screen for comparison with a large scale "master drawing" attached to the screen. It has always been the invariable practice to use a master drawing made by the use of opaque lines. I use transparent lines. The present invention is directed to a machine and devices thereof, including methods and tools, by means of which one can very accurately remove line-like areas of the emulsion coatings of glass plates for the production of such "bright line" or transparent line master drawings, so that light when passed through those areas of removal passes only through the glass to give a bright-line appearance. In other words, the degree of transmission of light is increased in those line-like areas, or in other words, reduction of light is prevented in those areas. Thus, instead of using an opaque line which blocks out the light, I produce an article in which the areas corresponding to master drawing delineations do not block out the light. The result is that a shadow appearing in the translucent emulsion-covered areas is contrasted with transparent line-like areas. One of the problems in accurately making my new kind of master plate or drawing as an article of manufacture has been to cleanly remove emulsion from the plate to restore full transparency in those line-like areas of delineation, and to cut and remove the emulsion substantially without scratching the glass plate. I have solved this problem by providing a delineating machine of proper construction and by a new use therein of new types of tools in a new manner, to accomplish the above results rapidly and with a high degree of accuracy.

Inasmuch as I believe myself to be the first to conceive of the use of a transparent line (as distinguished from an opaque line) in the making of "master drawings" for optical inspection uses, I believe also that I am the first to discover tool constructions and the uses of such tools to cut emulsion on a glass plate, to produce the bright-line delineation needed for such a master drawing. Since I believe myself the first to discover how to make such tools and how to use them for the above purpose, I also believe that I am the first to make a machine rigid enough to properly use such tools in a manner to obtain the necessary drawing and cutting accuracy required for the production of such a transparent-line master drawing. The various elements per se, as well as those elements in combinations hereinafter described are therefore in their principal phases all related to the object of producing bright-line master drawings of the kind above mentioned, and by the act of cutting and removal of emulsion coatings from transparent plates.

Objects of the invention are therefore to provide proper tools and to provide means for making and sharpening the tools, and to provide means for mounting and using the tools either for straight line or for circular line cutting to obtain an accuracy of emulsion removal and linecut quality which cannot be accomplished by any other means known to me.

Another object is to provide means by which such accurate drawings can be so made that accurate duplication by photographic process is possible. Such methods of duplication have been described in my above mentioned application entitled "Art of shadow screen inspection and methods and articles related to the same."

Another object is to provide a drawing device which has great rigidity whereby to obtain a very high degree of drawing accuracy, as is necessary for making my "bright-line" article.

Another object is to provide compass means which can be used as an attachment or as a permanent part of a slide which moves over a drawing table, to cut curved lines by swinging about a bearing carried by the slide. Another object is to so mount the compass arm that it is rigidly but swingingly held by one end only to move in a plane parallel with the top plane of the drawing table, its pivotal connection with the slide, being the sole means for supporting it by cantilever action. In the circular cutting of emulsion coatings of glass plates or in drawing on any material which may be adversely marred if an auxiliary supporting leg rests on and is drawn across its surface, a difficult problem has been to make a device which is rigid enough to obtain drawing accuracy, but without the use of such a steadying leg. When a leg is used it either mars the drawing surface or engages the margin of the plate as an obstruction to its free and smooth swinging motion.

Features of the invention include: The triangular relation of the guiding shoes of the carriage and the L-shaped configuration of the carriage to the use of the compass arm and to a table which lies between front and rear carriage-guiding ways; the use of a single element as a holder for a tool, as a holder for a microscope and as a pivotal bearing for the compass arm; the particular manner of holding and adjusting the tool to have its facet in a certain relation to the movement of the slide, movement of the carriage and line of cut; the arrangement and mounting and construction of the tool holder in relation to the slide of the compass or trammel arm; the specific constructions of the tools as emulsion cutting implements; the methods of making the tools; a method of forming or sharpening and making duplicate tools; the fixture for making and sharpening tools, including tools particularly adapted for cutting emulsions; the making of a sharpening fixture which can be magnetically held by a magnetic chuck; the making of a fixture having a plurality of faces, each of which is to be engaged with a support in order to properly complete a plural-facet grinding of a tool held thereon; the details of construction of the means by which the carriage is clamped to the slide of the stationary scale; the means for adjusting the pressure on the tools for the purpose of obtaining proper cutting action in relation to emulsions on plates without marring of the glass plates; the construction of the tool-carrying slides by which said slides are slidably guided and by which they can be securely clamped to their guides; the manner of using springs and weights to obtain proper cutting pressure on the tool point; all broader ideas of means inherent in the disclosure; and all details shown or described.

Objects, features and advantages of the invention will appear in the description of the drawings forming a part of this specification, and in said drawings:

Fig. 1 is a top plan view illustrating the general construction of my emulsion-cutting and drawing machine;

Fig. 2 is an approximate full scale top plan view showing the construction for mounting the compass attachment on the carriage slide and showing the manner of mounting the compass tool on its slide;

Fig. 3 is a detail vertical section taken approximately on line 3—3 of Fig. 2 and additionally showing how the center-locating microscope is used, when circular cutting or drawing with the compass or trammel is to be accomplished;

Fig. 4 is a vertical transverse section through the front rail and drawing table showing the carriage slide in elevation with the tool in cutting relation to emulsion of a plate disposed on the table, and showing the closely spaced relation of slide and drawing table;

Fig. 5 is an enlarged detail plan view showing the positions of the pin and the facets of the tool of the carriage slide, as when the slide is being moved for cutting action;

Fig. 6 is a view similar to Fig. 5 showing the position of the pin and the facets of the tool as when positioned for movement of the carriage for cutting action;

Fig. 7 is a view of the carriage slide tool with its weight; very much enlarged to show the relation of the pin to the facet of the tool point;

Fig. 8 is a view partly in section showing the structure and method of mounting the compass or trammel tool; very much enlarged to show the relations of the slot of the tool holder to a facet of the tool, in relation to the direction of circular motion of the compass arm;

Fig. 9 is a plan section approximately on line 9—9 of Fig. 8 showing the clamping action of the sleeve and the relation of the key and groove;

Fig. 10 is a view of one form of centering microscope which is to be used in the manner shown in Fig. 3;

Fig. 11 is an enlarged plan section showing the relation of the facets of the tool point to the emulsion being cut, and showing the direction of the stroke in relation to the tool point facets;

Fig. 12 is a top plan view showing the carriage clamp cooperating with the slide of the stationary scale, with the clamp in locking position;

Fig. 13 is a front elevation of the construction of Fig. 12, the slide being in section to show the locking action;

Fig. 14 is a view similar to Fig. 13 but with the clamp in release position;

Fig. 15 is a top plan view of the carriage slide shown in Fig. 2 illustrating certain important details related to rigidity of structure;

Fig. 16 is a vertical transverse section taken approximately on line 16—16 of Fig. 15;

Fig. 17 is a side elevation of the sharpening fixture showing its use when sharpening the carriage slide tool;

Fig. 18 is a view of the base face of the pyramidal fixture or block, looking in a direction parallel with the axis of the tool;

Fig. 19 is a detail inner face view of the split sleeve structure for engaging the pin of the tool or tool holder to properly position it in relation to pyramidal faces of the holder or block to hold the tool against rotation;

Fig. 20 is a side view of the device of Fig. 19 taken from that side opposite to the side shown in Fig. 17;

Fig. 21 is a view similar to Fig. 17 showing the fixture as used for sharpening the point of the tool for the compass or trammel slide;

Fig. 22 is a view of the base face of the pyramidal block looking in direction of the axis of the tool and showing the centering sleeve with its key;

Fig. 23 is a side elevation of the key-carrying sleeve of Figs. 21 and 22;

Fig. 24 is an inner face view of the key-carrying sleeve of Fig. 23;

Fig. 25 is an inner end view of the second and longer sleeve shown in Fig. 21;

Fig. 26 is a side elevation of the same;

Fig. 27 is a view of a modified form of tool point looking at its cutting face;

Fig. 28 is a side view of the tool of Fig. 27;

Fig. 29 is an end view of the point of the tool of Figs. 27 and 28; and

Fig. 30 is an end view of a tool of the type shown in Figs. 7, 8 and 11, showing the flattened point on a somewhat exaggerated scale.

Fig. 31 is a plan section taken on line 31—31 of Fig. 3;

Fig. 32 is a front elevation of a two-facet form of cutting tool;

Fig. 33 is a side elevation of the tool of Fig. 32; and

Fig. 34 is a bottom view of the tool of Figs. 32 and 33.

Referring to the drawings, and first to Fig. 1. The numeral 1 indicates a pedestal base having suitable supporting feet 2. Secured to the top of this base is what may be called a spider frame, which in this instance comprises four diagonally arranged arms 3, the ends of which are turned forwardly and rearwardly at opposite sides of the machine as indicated at 4. Braces 5 connect opposite pairs of arms 3 to provide a rigid supporting structure. To the outer ends 4 of the spider arms 3 are secured parallel rails front and rear respectively indicated 6, 7. On the rail 7 is secured an elongated way 8 and to the rail 6 is secured a relatively shorter way 9.

A rotatable table 10 is arranged between the ways 8 and 9 (see Fig. 1) with its top at about the same level as the tops of the tracks 8 and 9 and in close relation to the bottom of a carriage which is herein generally designated 12. The carriage has the form of a very rigid casting and it is so shaped as to very strongly resist tipping on its ways. The table has a depending central sleeve portion 14 surrounding a spindle 15, which spindle projects upwardly from the base 1 and above the spindle arms 3. The table is strongly rotatably supported by ball bearings interposed between the sleeve and the spindle. The ways 8 and 9 are of inverted V-shaped configuration and the carriage 12 is supported on these ways for movement in a direction which is transverse to the direction in which an operator faces the machine.

The carriage has an elongated rear arm designated 17, which is supported at two widely spaced points by bronze shoes 18 which fit the V-shaped way. The carriage also has an arm 20 perpendicular to the arm 17 and the outer end of this arm is supported on way 9 by means of a suitable bronze bushing 21. It will be noted that these three points of support 18 and 21 are related as the points of a triangle, the base of the triangle being along the arm 17 and one of the apexes being the bearing point 21. The triangle thus points towards the operator's station. In this arrangement an L-shaped frame is formed by the arms 17 and 20, and a bracing arm 22 connects the outer ends of the arms in the manner shown. Extending longitudinally and as a lateral extension of the arm 20 is a scale 25 and movable along this scale is a scriber or cutter slide generally designated 26 which is an important structure. Also movable along this scale are stop slides 27, 28. The construction of the slide 26 and the means thereon for holding a cutting tool are described in more detail herebelow.

At the front of the machine extending parallel with the track 9 is a scale 30 having a vernier slide 31 guided on suitable ways and having a sighting opening. This slide is adapted to be adjusted to any position along the scale 30 and then locked in that position and thereafter the end of the arm 20 is adapted to be brought into abutting relation with the slide 31. Means is provided shown in Figs. 12, 13 and 14 and later to be described in detail, by which the carriage can be strongly locked to the slide 31 in this abutting relation. The front scale is also provided with a slide stop indicated at 32. Vernier means generally indicated at 35 is provided. Means is also provided for clamping the table 10 in any rotated angular position. The details of this mechanism for clamping the table and of the vernier have been described in my copending application Serial No. 459,102, and are not claimed herein.

The scales 25 and 30 are herein shown as calibrated in inches and they extend at right angles to one another. The scale 25 is, of course, movable with the carriage over the table, while the scale 30 is immovable on the base. The tangent relation of the circular table to the front and rear ways 8 and 9 should be noted, and it should also be noted that because of the L-shaped configuration of the carriage, practically the entire surface of the table is exposed when the carriage is at an extreme position. The arrangement of the bearing points 18 and 21 are important in relation to nontipping and rigidity, and this arrangement, coupled with the strong mounting of the slide 26 and its cutter holder, particularly adapts the machine for accurate cutting, both with and without the circle arm or trammel tool.

There are also mounted on the frame two "figuring" tables 36, each being supported on the front rail 6 adjacent the ends thereof. It will be noted that the arm 20 moves between these tables and that the scale 30 is arranged intermediately of them.

Referring first to Figs. 2 and 3. The scale 25 is arranged between horizontally coplanar V-shaped ways indicated at 40 and with these ways is engaged what may be considered to be the cross-sectionally C-shaped cutter slide 26, a cross-section of which is shown in Fig. 16. The construction of this slide is important and is a feature, because of the manner in which it can be strongly held in any adjusted position very rigidly against tipping action out of a horizontal plane. This cutter or scriber slide 26 (see Fig. 3) has a vertical opening 41 which receives a tubular element 42 which has a press fit therein.

This tubular cutter and compass arm mounting element 42 has extending longitudinally downward from its top a pair of slots respectively designated 43, 44. These slots are in this instance at right angles to one another. One of them faces in direction of movement of the slide 26 and the other faces in direction of movement of the carriage 12 or of the arm 20. The directions of motion are respectively designated A and B in Figs. 5 and 6. The relations of the facets of the cutting tool to these slots and to the directions of motion of the slide and carriage is a feature of the invention. The arrangement also adapts this invention for cutting emulsions with a tool especially constructed for cutting and for clearly removing line-like portions of such emulsions from glass plates or plates of other material which have good transparency, without destroying the transparency of the glass along the line of cut.

A shallower slot 45 is provided intermediately of the slots 43 and 44 as shown. To locate the tube 42 to have the slots in proper relation to the slide, and to limit downward motion, the tube is provided with a flange 46 and this flange is provided with a notch 47 with which is engaged the reduced end of a positioning key 49 suitably held by dowel pins and a screw as shown. The openings for these dowel pins and screw are shown in Fig. 15.

As best shown in Figs. 5, 6 and 7, a tool holder is generally designated 50. This tool holder has a pin 51 adapted to be engaged in the slots 43, 44 or 45. When engaged in the slot 45 the tool 52 is raised out of contact with the emulsion, or in the case where a delineating device other than the tool is placed in the holder it is raised from contact with the drawing paper. I have found that the shape of this tool and the relation of its facets to the line of draft is an important feature in obtaining clean line removal and uniform line width removal of emulsions from glass plates on which they are spread. The pin 51 of the holder 50 is in this instance made to point in the same direction as the direction in which a facet 54 faces. When the pin is in either of the slots 43 or 44, this facet 54 is disposed perpendicularly to the direction of motion of the slide 26 or to the direction of motion of the carriage arm 20, and the facet faces toward the direction in which the slide or carriage is drawn or is moved. The particular constructions of the tool as shown in Figs. 7, 8, 11, 27, 28 and 29 are also features, as well as the method of making the tools and for sharpening the same. Another feature relates to the particular device for sharpening tools having different diameters.

A glass plate is indicated at 55 and its emulsion coating at 56. The emulsion of this plate is to be cut and removed to provide brightly transparent areas, as delineations of a master drawing, for use with an optical inspection machine.

As fully set forth in my above mentioned application, the plate on which the emulsion is spread is of good light-transmitting quality. Various materials may be used for coating the plate to provide a homogeneous light-transmitting film or layer of uniform thickness and of the proper optical density and which can be cut. The coating material or layer may be composed of a suspension of small particles of metallic silver in gelatin, and the coating is sufficiently hard to be permanent in storage and handling. I am not concerned with the manufacture of the material for the coating. Manufacturers of photographic films and emulsions are skilled in such matters as precipitation of silver from silver salts and in methods of dispersing such finely divided particles of silver evenly in a suitable carrying medium in the proper proportion. The film or coating which I cut is not light-sensitive in a photographic sense, but the material may be made by suitable modifying photographic emulsions. The film is quite thin and should be of even thickness throughout. The scribing tool which I have invented is capable of acting on such material to obtain clean, uniform line-width cutting and removal of the material.

An important feature of this invention is best shown in Figs. 1, 2 and 3, and relates to the means by which a compass arm or trammel can be attached to the slide 26 to always be swingably held in parallel relation with the top surface of the drawing table 10. Heretofore it has been necessary to use an auxiliary supporting leg at the end of the compass arm or trammel to prevent sagging of the same. The present invention provides means by which sagging is prevented, without the use of such auxiliary supporting leg.

Referring to Fig. 3, it will be noted that the tube 42 is utilized as a pivotal bearing for the compass arm 60 and therefore performs a dual function as such a bearing and as means for holding the tool or for holding a tool holder 50. Tube 42 also functions for holding and centering a microscope generally indicated at 61, which microscope is used when the compass is used. The compass arm 60 is attached by means of dowel pins and screws as shown in Figs. 2 and 3 in halved-together relation with and to a horizontal arm 63, which arm is an extension of an elongated tubular bearing element 64. The arm 60, as attached to this tube 64, is quite close to the upper surface of the slide 26 and to the table, and the bottom of the tube 64 engages the top of the limiting flange 46 of the tool-holding tube 42, as shown in Fig. 3. By means of the tube 64 a long bearing is provided about the tube 42, and since this tube 42 has a press fit in the opening 41, it is strongly held with its long axis maintained in perpendicular relation to the top surface of the table 10. Gravity action or weight of the arm and its slide and tool, as well as friction between the tubes, prevents upward motion of sleeve 64 on tube 42. It is to be noted that it is possible to simultaneously use the compass arm 60 or trammel when the tool holder 50 is in the tube 42. Thus a tool point may be used for locating a center for the compass, and is a feature. However, the use of a microscope in the tube 42 for locating the center is best and is preferred and is a feature. When the compass arm 60 is used, the microscope 61 is also used for accurately locating the point on the emulsion plate (or on a sheet of drawing paper) about which the arm 60 is to swing to cause its tool 52 to cut the emulsion 56, or to make a line.

Slidable on the compass arm is a tool-carrying slide 66, the guiding construction of which may be and preferably is substantially like the corresponding construction of the slide 26 shown in Figs. 15 and 16. This slide has a set screw 67 and has a vernier scale 68 for use with the graduation 69 of the compass arm. Mounted also on the compass arm or trammel is a second or stop slide 70 having a set screw 71 and an adjustable stop element 72 operated by a threaded thumb disk 73.

By reference to Figs. 2, 3 and 4 the rugged structure of the carriage, carriage arm and slide on the arm will be apparent. The press fit of the guide and pivoting tube 42 in the vertical opening of the slide, and the long bearing of the tubular element 64 of the trammel provides a strong connection with the slide 26, and makes it possible to successfully use the trammel without the use of a terminal supporting leg, and therefore avoids marring of the emulsion which must act as a shadow screen, and where the leg engages the table instead of the emulsion or drawing paper, also avoids sudden jarring impact of such a leg with the edge of the glass plate or of the paper and consequent joggling of the cutting tool and inaccurate drawing or cutting.

The construction by which a compass tool or compass tool holder may be held on the slide 66 is best shown in Figs. 3, 8 and 9 and this construction per se is a feature of the invention, just as the particular construction for swingingly attaching the compass arm to the tool 43 is a feature per se of the invention. The slide 66 is provided with a downwardly directed tubular extension 75 and the top plate 76 of the slide 66 has an opening 77 therein of the same diameter as the inner diameter of the tube 75. The tool holder is indicated at 78 and has the tool 52 which has the same cutting point and use characteristics as the tool 52 of the tool holder 50. The tool holder 78 is slidable vertically in the tubular member 75 and has (see Fig. 8) a longitudinal groove 79. This groove faces in the same direction as the facet 54 of the tool, and the facet 54 faces in direction of the cutting movement and is arranged perpendicularly to the circular line of cut. In this respect the tool action in relation to the direction of movement is the same as for the tool of the holder 50 of the slide 26.

In order to prevent rotation of the holder 78 a split sleeve 80 surrounds said holder, and is adapted to be clampingly engaged therewith by means of a headed screw 81, which screw also passes through an opening in a key 82, which key enters the slot 79. The screw 81 thus performs the dual purpose of clamping the sleeve and holding the key. The sleeve 80 and its key is the analogue of the device of Figs. 23 and 24, which latter structure is used in conjunction with the tool-marking or tool-sharpening fixture. The sleeve 80 has an extension 84 and the bottom of this extension engages the top of the plate 76 of the slide as shown. The extension 84 has an opening 85 therein through which passes a bolt 86 which is threaded in and anchored to the plate 76. This bolt is headed and between the head and the extension 84 is a spring 87. The spring is so adjusted as to obtain the proper pressure of the point of the tool 52 against the emulsion 56 of plate 55, and the adjustment of this pressure is necessary and important because clean line cutting of the emulsion must be obtained without any adverse marring of the glass plate. Therefore, the use of this spring, as well as of the weight 90 of the tool holder 50 is quite important and are features. A series of weights 90 are employed, with their weights graded to suit the cutting conditions and the character of the coating cut. Only one weight has been shown. Each weight has an axial recess in its bottom which fits over the top of the holder 50 and each has a downwardly projecting pin which enters the axial bore of the holder, as clearly shown in dotted lines in Fig. 7. I have found that a weight of about seven and one-half ounces is proper for one size of tool holder, but the weight should be varied conformably to the character of the emulsion being cut.

The microscope 61 has cross-hairs 37, indicated in Fig. 31, but carried by the ocular disk 91, see Fig. 10. When using the arm 60 the microscope is placed in the tube 42 as shown in Figs. 3 and 31. After the carriage 20 and the slide 26 have been positioned to have the cross-hairs directly over cross-lines marked on the emulsion of the glass plate, both the carriage 20 and the slide 26 are locked, respectively by thumb screw 100 and hook 110, see Fig. 13. Then the tool 78 of the compass arm 60 is moved to the proper place, and then the circular cutting stroke is made. Means for accurately locating the cross-hairs and limiting axial motion of the microscope are later described.

The construction of the slide 26 is important. Referring to Figs. 2, 15 and 16, and first to Fig. 16. The top plate of the slide has secured to its bottom a pair of bronze guide elements 92, 93, each of which has a V-shaped groove slidingly engaging a corresponding way 40. One of the guides 92 is immovably held to the top plate by means of screws 94, and a vertical finishing plate is attached by suitable screws to the top plate. The top plate has an opening downwardly through which the scale 25 can be viewed and is provided with a slanting surface against which a vernier plate 95 is attached in the manner shown in Fig. 2. The opposite bronze guide element 93 is secured by means of two shoulder screws 96 passing through slots 97 in the bronze guide piece 93 and threaded into the top piece of the slide. The bronze guide 93 is provided with four horizontal sockets, each of which has a spring 98 therein reacting against a vertical side plate 99 connected by screws to the top plate to keep the guide firmly but yieldably pressed against the corresponding V-shaped guide 40 of the arm. This spring pressure is sufficient to allow easy sliding movement of the slide 26 on its guides 40. As soon as the slide has been moved to the proper position in relation to the graduation on the scale 25, a set screw 100 is operated by its handle to supplement the spring action and solidly clamp the slide at its adjusted position. The top of the slide is provided with three openings for the reception of the dowel pins and screw used for the attachment of the locating key 49 (see Fig. 2). As shown in Fig. 2, the slide 26 is provided with an operating handle 101.

Another feature of this invention relates to specific means for strongly holding the carriage 12 or its arm 20 in abutting relation with the slide 31 of the stationary scale 30. Referring to Figs. 1, 4, 12, 13 and 14. On the outer end of the arm is secured an L-shaped bracket 105, the bracket being secured by suitable screws 106. Against the vertical outer face of this bracket is an eccentric 107 rotatably secured by a screw 108 which passes through the upright part of the bracket and into the carriage. Rockably mounted on and held against outward motion by a flange of the eccentric is a lever 109 having a hook 110 and when the eccentric is rotated, it bodily translates the lever in direction of carriage motion. The lever is brought to and normally held in raised or inoperative position by means of a spring 111 acting on a suitable button 112 as shown in Fig. 14. After the carriage has been brought to abutting relation with the slide as shown and after the lever has been depressed to bring its hook into the opening 113 of the slide, rotation of the cam draws the hook against the side 114 of the opening as shown in Figs. 12 and 13, whereby to firmly hold the arm in said abutting relation. A handle 115 attached to a lug of the eccentric 107 is provided for operating the eccentric. The slide 31 preferably has the same construction as the slide 26 insofar as its guiding means are concerned and has a handled clamping screw 116 for firmly holding it at its required position. This slide also has a vernier like 95.

An important feature of this invention is in the art of forming the emulsion cutting point of the tool herein shown, and particularly the formation of the cutting point from cylindrical tool stock and from hard metal known as "carbide," by the use of a fine diamond wheel, and by grinding facets which are related as the sides of a regular triangular pyramid and which converge to define the cutting point. Another feature is the provision of a block having the shape of a truncated regular triangular pyramid with its pyramidal faces having the same angular relation to the pyramidal axis as is desired for the angular relation of the point-defining facets of the tool to the long axis of the tool stock.

Important features of this invention relate also to the means by which tools 52 per se, or such tools, each in its special holder 50 or 78, can on one and the same fixture have its point formed from suitable tool stock or can have its point reshaped after formation. These tools while in their holders (which holders are adapted to be held on their slides in a predetermined relation to slide and carriage motions) can be placed in the fixture and thereafter it is only necessary to rotate the fixture to place its successive sides against the holding surface of a magnetic chuck (or of the table of the grinding machine) to correspondingly successively dispose the tool stock in proper position for pointing, or dispose the facets of an already pointed tool in proper grinding relation to a grinding wheel.

The method of grinding and the fixtures for doing it are therefore closely related to the apparatus with which the tools are used. In fact, one of the elements which holds one of the tool holders in its slide can be used for securing that holder in the fixture against rotation and translation.

Now referring to Figs. 17 to 26, inclusive. A block 120 of suitable material is used, preferably of a material which lends itself to magnetic attraction so that it can be immovably held by a magnetic chuck 121 in relation to the grinding wheel of a suitable machine. The making of the fixture so that it can be held by a magnetic chuck and the use of a chuck for this purpose is a feature of this invention. The block has the shape of a truncated regular pyramid with its pyramidal faces 122 having the same angular relation to the pyramidal axis of the block as is desired for the angular relation of the point-defining facets of the tool to the long axis of the tool stock, which stock is preferably of cylindrical configuration.

As shown in Figs. 17, 18, 21 and 22, the block or fixture has a bore 123 passing entirely therethrough and the axis of the bore is coincidental with the pyramidal axis. The bore is cylindrical if the stock is cylindrical. The diameter of the bore in this instance is large enough to receive and center the holder 50 shown in Fig. 7. The diameter of this holder is larger than that of holder 78. Holder 50 has the pin 51 pointing in the same direction as facet 54 of its tool 52, faces. The tool holder is positioned as shown in Fig. 17 with one of the tool facets facing upwardly and horizontally as at 125, to be engaged by a bottom periphery of a grinding wheel 126 which rotates on a horizontal axis. The fixture is adapted to be held by the magnetic chuck 121 which may be in turn mounted on the table of a conventional grinding machine. The tool point is held in this position against rotation and translation by means of a split clamping sleeve 127 shown in detail in Figs. 19 and 20. This sleeve has a notch 128 for engaging the pin 51 of the holder 50. The position of this pin is shown in dotted lines in Fig. 18. The sleeve 127 has an arm 129 held by means of a screw 130 engaging the threaded socket 131 in the face of truncation 132 of the pyramidal block. The split sleeve 127 is provided with a suitable clamping screw 133.

Now referring to Figs. 21 to 26, inclusive. The base face 134 of the pyramidal block has threaded openings 135 therein for use when a tool per se, or when the tool in its holder 78 is to be operably supported in the fixture. Preferably, in making a tool it is permanently fixed in a holder which will fit the opening of a slide of the drawing machine. Thus, for either making or for resharpening, the tool is held in the same holder with which it is used to cut emulsion. Since I use a very hard metal known as "carbide" for the tool, and because I use cylindrical stock which is about one-eight of an inch in diameter, it is particularly desirable to use a holder for the stock.

Inasmuch as the diameter of the tool holder 78 is less than the diameter of the tool holder 50, centering sleeves 138, 139 are inserted in the bore 123 of the fixture, the inner diameters of which sleeves are substantially the same as the outer diameter of the holder 78. One of these sleeves 139 is split and has attached to an arm 140 which is adapted in turn to be attached as shown by a screw 141 which is threaded into one of the openings 135. This sleeve has a key 143 which engages the groove 79 of the tool holder 78 in substantially the same manner as is shown in Fig. 8. In this instance the key sleeve 139 is inserted from the base face side 134, while the other and longer sleeve 138 is inserted from the face of truncation 132.

The key-carrying sleeve for use with the holder 78, when in the fixture or block 120, may be made exactly like that of the corresponding key-carrying element of Figs. 8 and 9, and may be used interchangeably. In Fig. 22 I have shown in dot-and-dash lines the parts 84 and 85 of the key-carrying element of Figs. 8 and 9 to indicate this interchangeable use, and this use is a feature. It will be noted, therefore, that, broadly speaking, the means for holding the compass tool in its slide and for holding it in the sharpening fixture are the same, that is, in each case groove and slot means holds the tool against rotative movement and clamping means holds it against axial movement. In each case the key-equipped clamping sleeve has an extension which is attached to a stationary member.

The use of a fixture or block of the nature above described is believed to be broader than its use with particular kind of tools treated of herein, although the particular use is believed to be entirely new as a means for making or sharpening emulsion-cutting tools. The device may be used to form the points of any kind of tool with any number of facets. The broad gist of the invention is that by rotating the block to bring its successive faces, whatever their number, into relation with a supporting surface, particularly with the surface of a magnetic chuck, the tool stock, whether it be cylindrical or of other configuration, can be accurately ground and the exact character of grinding can be duplicated so long as the tool stock is always placed in the same predetermined relation to the pyramidal faces of the block. I also believe it entirely new to provide in this art a set of elements for the purpose herein.

This invention also relates to specific emulsion-cutting tools, and to methods for forming the same. The tool, best shown in Figs. 7, 8, 11 and 17, has a point produced by grinding cylindrical stock to provide convergent facets 54. These facets are herein related as the faces of a regular triangular pyramid. The manner of using the tool for cutting emulsion has been previously described. If the slide is drawn toward the operator, as is desirable, then one of the facets should face in the operator's direction. I have done considerable experimenting to discover the relation which is necessary for the proper cutting of emulsions on glass plates and therefore believe that the tools themselves are new as well as the methods of making and using them. A good included angle for the point is 51°, see Figs. 27 and 32.

Another feature of the invention relates to the flattening of the point of the tool after grinding the same to a fine point.

I have discovered that a sharp pointed tool may mar the glass, and since marring of the glass must be avoided in the production of my "bright-line" "master plates" it is an object to cleanly remove line-like areas of the emulsion substantially without marring the glass. Therefore, after the sharp point is formed, as by the use of my fixture, I flatten that point as at 146 until it is about .006 of an inch across. The width of the flattened area may be varied slightly conformably to the width of line desired, but for making my "master plates" the width of the point above mentioned is the best for most purposes. This flattened face is perpendicular to the long axis of the tool and when the tool engages the glass it is a flat engagement. For clarity this flattening has been exaggerated in Fig. 30. The line D—D in Fig. 27 exaggeratedly represents the line of cut, when removing a very small portion of the point of the tool to obtain the proper flattening. It will be understood that this flattening is used in all types of tools which are used for cutting emulsion on glass plates for my purposes, that is, the types shown in Figs. 7, 8 and 30, and in Figs. 27 to 29.

Another form of tool is shown in Figs. 27 to 29, inclusive. For cutting emulsion this tool should be used exactly in the same manner as for the previously described tools, whether sharp-pointed or flat pointed. The invention relates to the tool per se and the method of forming it.

This tool (as well as the others) is made from cylindrical tool stock and from hard tool stock known as "carbide." In the method for making this tool for cutting emulsions the stock is ground to a sharp point, as in the case of the other tools, and the facets are related as the faces of a regular triangular pyramid. A cutting face 147 is then formed by grinding away the metal in a direction parallel to the long axis of the stock and crosswise along a diameter which is perpendicular to one of the angle lines 148 between the facets. The axial extent of the removal of the metal is substantially as far as the intersection 149 of one of the facets with the cylindrical surface of the stock.

In using this tool its cutting face is held perpendicularly to the direction of movement of the tool and faces in a direction of movement. That is, as in the case of the first tool, if the tool is being drawn towards an operator, then this cutting face is faced toward the operator and is perpendicular to the line of draft. In all cases preliminary grinding of the facets can be accomplished by means of the block 120 as one element of a set of fixtures previously described. The point is then flattened.

The length of the line to be drawn by the tool of the slide 26 is determined by the two stops 27, 28 and which have suitable clamping screws as shown.

The mechanism which has been generally designated 35 is described in detail in my copending application Serial No. 459,102, but it may be said that a vernier is provided as shown and that over this vernier there is a sliding window through which both the gradations of the table and of the vernier may be observed. The window frame is slidably guided along the support of the vernier.

By an inspection of Fig. 1 it will be seen that straight lines can be drawn at right angles to one another, first by moving the slide 26 and then by moving the carriage along the ways 8 and 9. After drawing lines by movement of the slide 26, a line at right angles thereto can be drawn either by moving the carriage or by rotating the table through an angle of 90 degrees and then again moving the slide 26. Straight lines having angular relations other than 90 degrees can also be drawn by rotating the table 10 through the desired angular distance, and then moving the slide 26 and its scriber along the scale 25. The guide means for the slide 26 is important, because for accurate cutting its movement must be easy, smooth, regular and nontipping.

Circular lines can be cut or other arcuate lines can be cut in the emulsion in two ways. One, the preferred way, is to draw circular lines or circles by the use of the compass arm or trammel while the carriage and table remain stationary. A second way is to shift the plate to bring the center exactly over the axis of rotation of the table 10, and then appropriately move the carriage to bring the point of the tool to the desired radial distance from the center of the table, whereafter the table is rotated through the necessary angular distance to cause the desired circular line to be cut in the emulsion.

It will be clear from the previous description that all that is necessary is to move the compass arm slide to the appropriate position and then lower the point of the tool and then swing the arm or trammel. By means of the various instrumentalities provided herein, cutting of the emulsion for purposes of making duplicate plates can easily be accomplished with repeatable accuracy to thousandths of an inch. With the scales and verniers on the table and on the carriage and on the base, the drawing of lines at various mutual angles can be accomplished and duplicated in increments of 5" of an arc. The cross hairs of the microscope can be positioned at the desired point with great accuracy for cutting with the tool of the compass arm. A very valuable feature is the interchangeability of the microscope and the tool in the slide 26, and a valuable feature is that the trammel or compass arm can be used while the tool is held within the member about which said arm swings.

In all forms of the invention the tool is so mounted in its holder as to permit its axial motion, but the motion is yieldably limited either by springs or by weights. In all forms of the invention the spring and weight pressure is toward the plate from which the emulsion is being removed, or toward the sheet of material on which the master delineations are being made. In all forms also, when emulsion is being cut, one of the facets of the tool is always positioned perpendicularly to and facing in the direction of motion of the tool slide.

It is noted that the tool of the slide on the arm of the carriage must move in either of two directions, which in this case are at right angles to one another, to-wit: Crosswise of the front and rear tracks and toward the operator, or lengthwise of the front and rear tracks or parallel therewith. It will be understood that these directions of motion need not always be at 90° to one another and while the 90° relation is claimed specifically herein, there is no intention to limit the broader aspects of the invention to such a relation.

The means for locating the cross-hairs 37 of the microscope of Figs. 3, 10 and 31 are related to the slots 43 and 44, as is also the means for limiting downward axial motion of the microscope. The tube 150 is exteriorly threaded as at 151 with fine pitch threads which mate with corresponding interior threads of a sleeve 152, which fits snugly over the upper end of slotted tube 42. The sleeve 152 has pins 153, 154 having exactly the same angular relation as slots 43 and 44. The pins engage the slots to hold the sleeve against rotation during focusing. The microscope is brought into focus by rotating it in the sleeve 152. At focus the cross-hairs respectively extend in directions of slide and carriage movements. After focusing the jam nut 156 is tightened to hold the tube 150 against rotation in sleeve 152. Thus, these slots 43, 44 serve the dual purpose of setting the sleeve 152 against rotation, and of receiving the pin 51 of the holder 50 as has been previously described. The pins 153, 154 are pressed in the lower wall of the sleeve 152 and rest on the bottom of the slots as shown in Figs. 3 and 31. The cross-hairs of the ocular are so arranged as to extend in the same direction as the slots, that is, in this embodiment at 90° to one another, and parallel with the pins of the sleeve 152.

The microscope is rotated and moved axially for focusing, and it will be noted that the microscope projects below its tubular support 42, and that its lower end is brought as close as is practicable to the emulsion coat of the plate, as supported by the table.

Another modification of tool is shown in Figs. 32 to 34, inclusive. The tool is formed of cylindrical stock. The effective part of the cutting point is in this form, as in the first form, defined by convergent facets. These facets (only two in this case) are indicated herein by numerals 160. The tool piece is ground in an axial direction in the manner best shown at 161, and this face intersects the ridge 162 to form the point 163. After this point is formed it is flattened for the same purpose as the tool of Fig. 30 is flattened. The tool moves in direction of arrow F when in use.

It will be noted, by comparison of the points of the various forms of tools, that the point of each is defined by intersecting facets. Facets or faces 54, 147, 161 always face toward the direction of movement of the tool during cutting. In each form, when the tool is in use, one of the edges or peaks formed by the meeting of two of the facets, slants upwardly and away from the point and is disposed in parallel relation with and lies above the line of cut. See 53 of Fig. 30, 148 of Figs. 28 and 29, and 162 of Figs. 32, 33 and 34. These ridges diverge away from the points, and each is disposed perpendicularly to the leading face of the tool.

What I claim is:

1. A device of the class described comprising, a base, a carriage movable on the base and having an arm, a scale on the base along which the arm is adapted to move, a slide movable on the base lengthwise of the scale, said carriage being adapted to abut the slide, means by which said carriage can be locked to said slide in abutting relation, including a hooked element on the carriage and a shoulder on the slide, and means on the carriage manually movable and adapted to translate the hooked element to cause its hook to engage the shoulder and firmly hold the arm against the slide in said abutting relation.

2. A device of the class described comprising, a base, a carriage movable on the base and having an arm, a scale on the base along which the arm is adapted to move, a slide movable on the base lengthwise of the scale and having a shoulder, said arm being adapted to abut the slide, a lever on the arm, means adapted to translate said lever in a direction lengthwise of the scale, said lever having a hook engageable with the shoulder of the slide when the arm and slide are in abutting relation and when the lever is so translated.

3. A device of the class described comprising, a base, a carriage movable on the base and having an arm, a scale on the base along which the arm is adapted to move, a slide on the base movable lengthwise of the scale and having an opening, one side of which acts as a shoulder, said carriage being adapted to abut the slide, an eccentric rotatable on the carriage, a lever rockably mounted on the eccentric and adapted to be bodily translated in the direction of carriage motion by said eccentric when said eccentric is rotated, said lever having a hook, a spring normally holding the lever so that the hook is clear of the slide, the relation of the parts being such that when the carriage is abutting the slide and the lever is depressed to bring its hook into the opening of the slide, rotation of the cam will draw the hook against the side of the opening of the slide, whereby to firmly hold the arm in said abutting relation, and a handle for operating the cam.

4. A device of the class described comprising, an arm having a pair of horizontal coplanar laterally disposed ways, a slide having slide blocks held by a plate overlying said arm and ways and engaging said ways, a scale arranged between the arm ways, an opening in the plate downwardly through which said scale can be viewed, an opening in the plate arranged close to and laterally of one of the arm ways, and adapted to receive a tool and to hold it with its long axis perpendicular, means securing one of the blocks for slidable movement horizontally, spring means for moving the block against the corresponding way and clamping means for supplementing the action of the spring means to strongly secure the slide against movement on its ways.

5. A device of the class described comprising, a slide on a movable arm, said slide having a tubular tool-holding member having a slot, a cutting tool within said tubular member having a point formed by convergent facets, said tool having a pin entering said slot and said slot, pin and facets being so related that when the pin is in said slot one of the facets is disposed perpendicularly to and facing the direction in which the slide is to be moved to make the tool perform its cutting action.

6. A device of the class described comprising, a movable arm, a slide on the arm movable thereon in a direction perpendicular to the direction of movement of the arm, said slide having a tubular tool-holding member having two slots, a cutting tool within said tubular member having a point formed by three convergent facets, said tool having a pin adapted to enter either slot and said slots, pin and facets being so related that when the pin is in one slot one of the facets is disposed perpendicularly to and facing the direction in which the slide is to be moved to make the tool perform its cutting operation, and when the pin is in the other slot, that facet is disposed perpendicularly to and facing in the direction in which the arm is to be moved.

7. In a device of the character described, which includes a movable tool-carrying slide, a tubular member on said slide provided with a plurality of slots, a tool holder in said tubular member provided with a pin, and a tool in said holder having a plurality of facets, said slots, pin and facets being so related that said pin may be selectively entered into any of said slots and thereby determine the direction in which a selected facet of said tool will face when said slide is moved.

8. A device of the class described, comprising a movable arm, a slide on the arm, a tubular member on the slide adapted to act as a tool holder, a second arm swingable by means of an elongated tubular element about said tubular member, a slide on and movable lengthwise of said swingable arm, and having a tool holder having a tool therein removably held.

9. A device of the class described comprising, a slide having a first tubular member, a second tubular member swingable about the first tubular member, said second tubular member having a compass arm, said compass arm having a second slide, a tool on said second slide, and means by which the tool can be adjusted axially, including means for holding the tool against rotation during such axial adjustment, and adjustable means associated with said last mentioned means for yieldably applying pressure in an axial direction to the tool.

10. A device of the class described comprising, a first slide having a compass arm pivoted thereon, said compass arm having a second slide, a tool held on said second slide, and means by which the tool can be adjusted axially and thereafter held against rotation, including a clamping sleeve having a key entering a groove of the tool, and adjustable means associated with said last mentioned means for yieldably applying pressure in an axial direction to the tool.

11. A device of the class described comprising, a slide having a guide sleeve, a tool slidable in said sleeve and also having a groove, a split sleeve embracing the tool and having an extension abutting the top of the slide, said split sleeve having a key entering the groove of the tool holder, means on the split sleeve for releasably clamping the sleeve to the holder and for securing the key in the sleeve, a bolt passing loosely through said sleeve extension and anchored in the slide and a spring on the bolt exerting a downward pressure on the sleeve, the parts being so related that when the point of the cutting tool is engaged with a surface to be operated upon, a predetermined pressure of the tool against the surface can be obtained by adjusting the tension of the spring and the relation of the key to the groove being such that the sleeve and tool holder can move upwardly axially against the action of the spring.

12. A device of the class described comprising, a first slide having a tube, a microscope passing through the tube and having cross-hairs which lie in the axis of the tube, means by which the microscope can be adjusted axially, an arm swingable about the tube and having a second slide movable therealong, said slide having a tool, whereby the cross-hairs of the microscope can be centered on some point and the arm can thereafter swing about the tube axis.

13. A device of the class described, including a slide movable on a movable arm and having a first tubular member, a compass arm having a tubular member embracing and swingable about said first tubular member, a third tubular member fitting over the top of the first tubular member, and a microscope tube within the first and third tubular members and in threaded connection with said third tubular member.

14. A device of the class described, including a slide movable on a movable arm and having a first tubular member having a slot, a compass arm having a tubular member embracing and swingable about said first tubular member, a third tubular member fitting over the top of the first tubular member and having a pin engaging said slot, and a microscope tube within the first and third tubular members, and in threaded connection with said third tubular member.

OSCAR C. HEDIN.